INVENTOR.
J. G. Wears

Patented Dec. 26, 1922.

1,440,257

UNITED STATES PATENT OFFICE.

JAMES G. WEARS, OF ECLA, TEXAS.

NONCHOKABLE BOOT FOR GRAIN ELEVATORS.

Application filed April 3, 1920. Serial No. 370,927.

*To all whom it may concern:*

Be it known that I, JAMES G. WEARS, a citizen of the United States, residing at Ecla, in the county of Gray and State of Texas, have invented certain new and useful Improvements in Nonchokable Boots for Grain Elevators; and I do hereby declare the following to be a full, clear, and exact description of the invention, such as will enable others skilled in the art to which it appertains to make and use the same.

Figure 1:
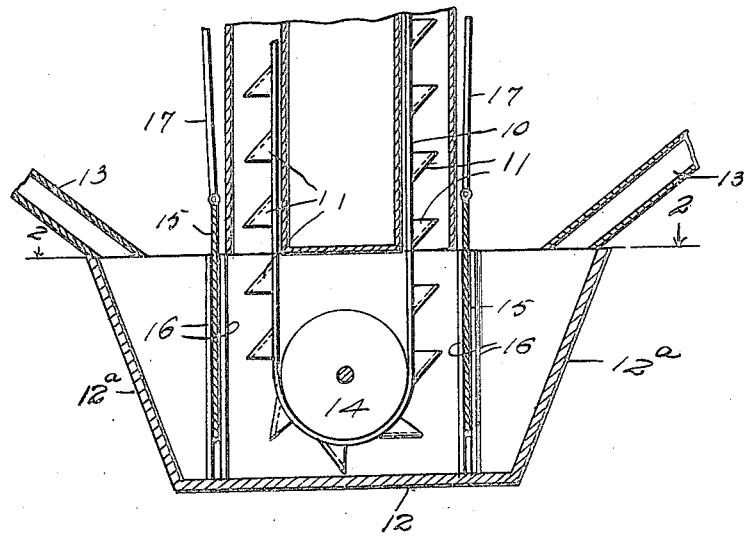
Figure 2:
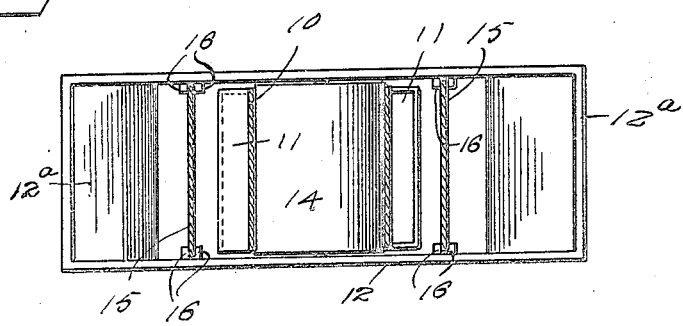

The object of the invention is to provide simple and efficient means whereby the choking or obstruction of the feed boot for grain elevators and the like may be avoided and whereby the rapidity with which the grain is fed to the elevator cups may be regulated to suit the size and condition of the grain which is being handled, means being provided to prevent access to the elevator cups of pieces of wood, iron, bolts and the like which may reach the boot through the grain spouts and which in practice frequently cause the breakage or injury of the elevating apparatus and under any circumstances cause damage in the cleaners to which the grain is carried by the elevator, and with this object in view, the invention consists in a construction and combination of parts of which a preferred embodiment is shown in the accompanying drawing, wherein Figure 1 is a vertical section of an elevator and boot embodying my invention, and Figure 2 is a section on the line 2—2 of Figure 1, looking in the direction indicated by the arrows.

In connection with the elevator indicated at 10 which is provided with cups 11 as in the ordinary practice there is employed a boot 12 which extends laterally beyond the sides of the elevator and is open at the top beyond said sides. Grain spouts 13, usually enter or communicate with said boot at the open tops and are disposed at a downward and inward inclination as indicated, the drum or pulley 14 around which the belt extends being arranged in such relation to the boot as to cause the cups in traversing the under side thereof to pass close to the bottom of the boot. The end walls 12ª of the boot are inclined but at different angles to the spouts 13 so as to minimize the chances of clogging of the material passing into the boot from the spouts 13.

Arranged in the boot between the planes of the grain spouts and the sides of the elevator apron are gates or fenders 15 consisting of substantially vertical plates mounted in guides 16 in the opposite walls of the boot and having connected therewith operating rods 17 which may be manipulated from the floor above by the operator to regulate the rapidity with which the grain passes from the outer or receiving compartments of the boot to the inner or delivery compartment thereof in which operates the apron carrying drum or roll 14. Obviously the distance of the lower edge of each gate or fender from the bottom of the boot will determine the rapidity of flow of the grain into the elevator and the depth of the grain in the delivery compartment, and moreover the interposition of these gates or fenders between the receiving and delivery compartments of the boot serves to retain foreign objects such as pieces of timber or iron, bolts and the like in the receiving compartment or chambers and prevent their entrance to the delivery chamber or compartment and hence their contact with the cups of the elevator in passing around the drum or roll since they are usually of a size impassable through the openings beneath the gates.

What is claimed is:—

A boot for grain elevators extending laterally beyond the sides of the elevator and disposed beneath the same, the boot being open at the top beyond said sides, inclined feed spouts communicating with the boot beyond said sides and having their discharge ends at the top of the boot, said boot having downwardly and inwardly inclined end walls at different angles to the spouts and onto which said spouts discharge, movable gates intermediate the said end walls and elevator, guide means for the gates within the boot, and means to actuate said gates operable at a distance therefrom.

In testimony whereof I affix my signature in presence of two witnesses.

JAMES G. WEARS.

Witnesses:
C. P. BENDER,
L. MCMURTRY.